United States Patent
Tajima

(10) Patent No.: US 10,333,446 B2
(45) Date of Patent: Jun. 25, 2019

(54) CONTROLLER FOR INDUCTION MOTOR

(71) Applicant: FUJI ELECTRIC CO., LTD., Kawasaki-shi, Kanagawa (JP)

(72) Inventor: Hirokazu Tajima, Suzuka (JP)

(73) Assignee: FUJI ELECTRIC CO., LTD., Kawasaki-Shi, Kanagawa (JP)

(*) Notice: Subject to any disclaimer, the term of this patent is extended or adjusted under 35 U.S.C. 154(b) by 0 days.

(21) Appl. No.: 16/043,983

(22) Filed: Jul. 24, 2018

(65) Prior Publication Data
US 2019/0097560 A1 Mar. 28, 2019

(30) Foreign Application Priority Data
Sep. 22, 2017 (JP) .................... 2017-182013

(51) Int. Cl.
*H02P 21/24* (2016.01)
*H02P 21/10* (2016.01)
*H02P 21/14* (2016.01)

(52) U.S. Cl.
CPC .............. *H02P 21/10* (2013.01); *H02P 21/24* (2016.02); *H02P 21/141* (2013.01)

(58) Field of Classification Search
CPC .......... H02P 21/14; H02P 21/24; H02P 21/10; H02P 6/28
See application file for complete search history.

(56) References Cited

U.S. PATENT DOCUMENTS

| | | | | |
|---|---|---|---|---|
| 4,442,393 A * | 4/1984 | Abbondanti | ............ | H02P 21/00 318/802 |
| 4,680,526 A * | 7/1987 | Okuyama | ............... | H02P 21/04 318/802 |
| 5,341,081 A * | 8/1994 | Yamada | .................. | H02P 21/09 318/800 |
| 5,532,570 A * | 7/1996 | Tajima | .................... | H02P 21/06 318/804 |
| 7,187,155 B2 * | 3/2007 | Matsuo | .................. | H02P 21/09 318/400.02 |

FOREIGN PATENT DOCUMENTS

| | | |
|---|---|---|
| JP | H06-086581 A | 3/1994 |
| JP | H07-264900 A | 10/1995 |

\* cited by examiner

*Primary Examiner* — Thai T Dinh
(74) *Attorney, Agent, or Firm* — Manabu Kanesaka

(57) ABSTRACT

A controller for an induction motor includes a proportional gain setter that sets a magnitude of a proportional gain of a current regulator, and the proportional gain setter sets the magnitude of the proportional gain based on the leakage inductance in response to the primary current.

5 Claims, 4 Drawing Sheets

| PRIMARY CURRENT | LEAKAGE INDUCTANCE $L_\sigma$ |
|---|---|
| SMALL | $L_\sigma$ (LARGE) |
| LARGE | $L_\sigma$ (SMALL) |

CONTROLLER FOR INDUCTION MOTOR

CROSS-REFERENCE TO RELATED APPLICATION

The priority application number JP2017-182013, Controller for Induction Motor, filed Sep. 22, 2017, Hirokazu Tajima, upon which this patent application is based, is hereby incorporated by reference.

BACKGROUND OF THE INVENTION

Field of the Invention

The present invention relates to a controller that drives an induction motor, such as a drive system for an automobile or a railroad vehicle, for example, or an inverter that drives a machine tool or the like, and more particularly, it relates to a controller for an induction motor that performs feedback control.

Description of the Background Art

A controller for an induction motor that performs feedback control is known in general, as disclosed in Japanese Patent Laid-Open No. 07-264900.

Japanese Patent Laid-Open No. 07-264900 discloses a controller that performs variable speed control of an induction motor. This controller includes a three-phase/two-phase converter, a vector rotator, a current regulator, a magnetic flux regulator, and a speed regulator. In this controller, the primary current of the induction motor is converted into two-phase quantities of a stator coordinate system by the three-phase/two-phase converter. In addition, the primary current converted into the two-phase quantities is converted into a magnetization current actual value and a torque current actual value by the vector rotator. The magnetization current actual value and the torque current actual value are input into the current regulator.

A magnetization current command value is input from the magnetic flux regulator into the current regulator. In addition, a torque current command value is input from the speed regulator into the current regulator. The current regulator outputs a magnetic flux axial component and a torque axial component of a primary voltage command value based on the input magnetization current actual value, torque current actual value, magnetization current command value, and torque current command value. Specifically, feedback control is conceivably performed such that the magnetization current actual value and the torque current actual value match the magnetization current command value and the torque current command value, respectively. In the feedback control, a magnetization voltage command value (torque voltage command value) is adjusted in proportion to a deviation between the magnetization current actual value and the magnetization current command value (a deviation between the torque current actual value and the torque current command value). That is, the magnetization voltage command value (torque voltage command value) is adjusted based on a proportional gain proportional to the deviation. The magnitude of the proportional gain is not clearly described in Japanese Patent Laid-Open No. 07-264900, but it is conceivably fixed.

When a slot of a rotor of the induction motor is closed (in the case of a slot, the stator side of which is not open), a portion of the rotor that closes the slot (a portion of the rotor corresponding to the stator side of a secondary conductor disposed in the slot) is thin, and hence a magnetic flux that flows through a magnetic body (rotor) is easily saturated. Thus, due to the saturation of the magnetic flux, the magnitude of a leakage inductance (an inductance corresponding to a magnetic flux, which does not intersect with the secondary conductor on the rotor side, of magnetic fluxes produced by a current that flows on the stator side) changes in response to the primary current. The proportional gain of the feedback control performed in the current regulator is proportional to the magnitude of the leakage inductance.

That is, in the conventional controller for the induction motor in which the magnitude of the proportional gain is fixed as described in Japanese Patent Laid-Open No. 07-264900, when the proportional gain is excessively large with respect to the leakage inductance, the primary current generated based on the feedback control pulsates (oscillates). When the proportional gain is excessively small with respect to the leakage inductance, the response time in the feedback control becomes relatively slow (the responsiveness becomes low). That is, in the conventional controller for the induction motor described in Japanese Patent Laid-Open No. 07-264900, the induction motor may not be appropriately controlled due to the leakage inductance.

SUMMARY OF THE INVENTION

The present invention has been proposed in order to solve the aforementioned problem, and an object of the present invention is to provide a controller for an induction motor capable of appropriately controlling the induction motor even when a leakage inductance changes with a change in primary current.

In order to attain the aforementioned object, a controller for an induction motor according to an aspect of the present invention controls the induction motor in which a leakage inductance changes with a change in primary current, and includes a current regulator into which a magnetization current command value and a magnetization current actual value, which are magnetic flux axial components of the primary current, and a torque current command value and a torque current actual value, which are torque axial components perpendicular to the magnetic flux axial components, are input, and that generates a magnetization voltage command value based on the magnetization current command value and the magnetization current actual value and generates a torque voltage command value based on the torque current command value and the torque current actual value, and a proportional gain setter that sets a magnitude of a proportional gain of the current regulator. The proportional gain setter sets the magnitude of the proportional gain based on the leakage inductance in response to the primary current.

As described above, the controller for the induction motor according to this aspect of the present embodiment includes the proportional gain setter that sets the magnitude of the proportional gain based on the leakage inductance in response to the primary current. Thus, the magnitude of the proportional gain is set by the proportional gain setter based on the leakage inductance in response to the primary current, and hence it is possible to significantly reduce or prevent an excessive increase or an excessive reduction in the proportional gain of feedback control with respect to the leakage inductance. Consequently, even when the leakage inductance changes with a change in primary current, the induction motor can be appropriately controlled.

In the aforementioned controller for the induction motor according to this aspect, the proportional gain setter preferably reduces the proportional gain when an amount of change in the leakage inductance in response to the primary current is large, and increases the proportional gain when the amount of change in the leakage inductance in response to the primary current is small. According to this structure, it is possible to appropriately significantly reduce or prevent an excessive increase or an excessive reduction in the proportional gain of the feedback control with respect to the leakage inductance both when the amount of change in the leakage inductance is large and when the amount of change in the leakage inductance is small.

In this case, the proportional gain setter preferably reduces the proportional gain when the amount of change in the leakage inductance in response to the primary current is equal to or more than a predetermined value, and increases the proportional gain when the amount of change in the leakage inductance in response to the primary current is less than the predetermined value. According to this structure, it is possible to easily determine, based on the predetermined value, whether the amount of change in the leakage inductance is large or small.

In the aforementioned controller for the induction motor in which the proportional gain is reduced or increased based on the predetermined value, the proportional gain setter preferably reduces the proportional gain based on the leakage inductance in a case of a rated load when the amount of change in the leakage inductance in response to the primary current is equal to or more than the predetermined value, and increases the proportional gain based on the leakage inductance in a case of no load when the amount of change in the leakage inductance in response to the primary current is less than the predetermined value. According to this structure, the magnitude of the proportional gain is set using two values of the leakage inductance in the case of the rated load and the leakage inductance in the case of no load, and hence it is possible to significantly reduce or prevent an increase in load on the controller as compared with the case where the number of values used is relatively large. Furthermore, the magnitude of the leakage inductance in the case of the rated load is relatively small, and hence the set proportional gain can be easily reduced. The magnitude of the leakage inductance in the case of no load is relatively large, and hence the set proportional gain can be easily increased.

The aforementioned controller for the induction motor according to this aspect preferably further includes a storage that stores a table in which the primary current and the leakage inductance are associated with each other, and the proportional gain setter preferably sets the magnitude of the proportional gain based on the table stored in the storage. According to this structure, it is possible to easily set the magnitude of the proportional gain based on the table stored in the storage without remeasuring the association between the primary current and the leakage inductance.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

Present Embodiment

The structure of a controller 100 for an induction motor 200 according to the present embodiment is now described with reference to FIGS. 1 to 8. The controller 100 controls the induction motor 200 in which a leakage inductance $L_\sigma$ changes with a change in primary current. The primary current denotes a current supplied from the controller 100 to the induction motor 200.

(Structure of Controller)

Figure 1:
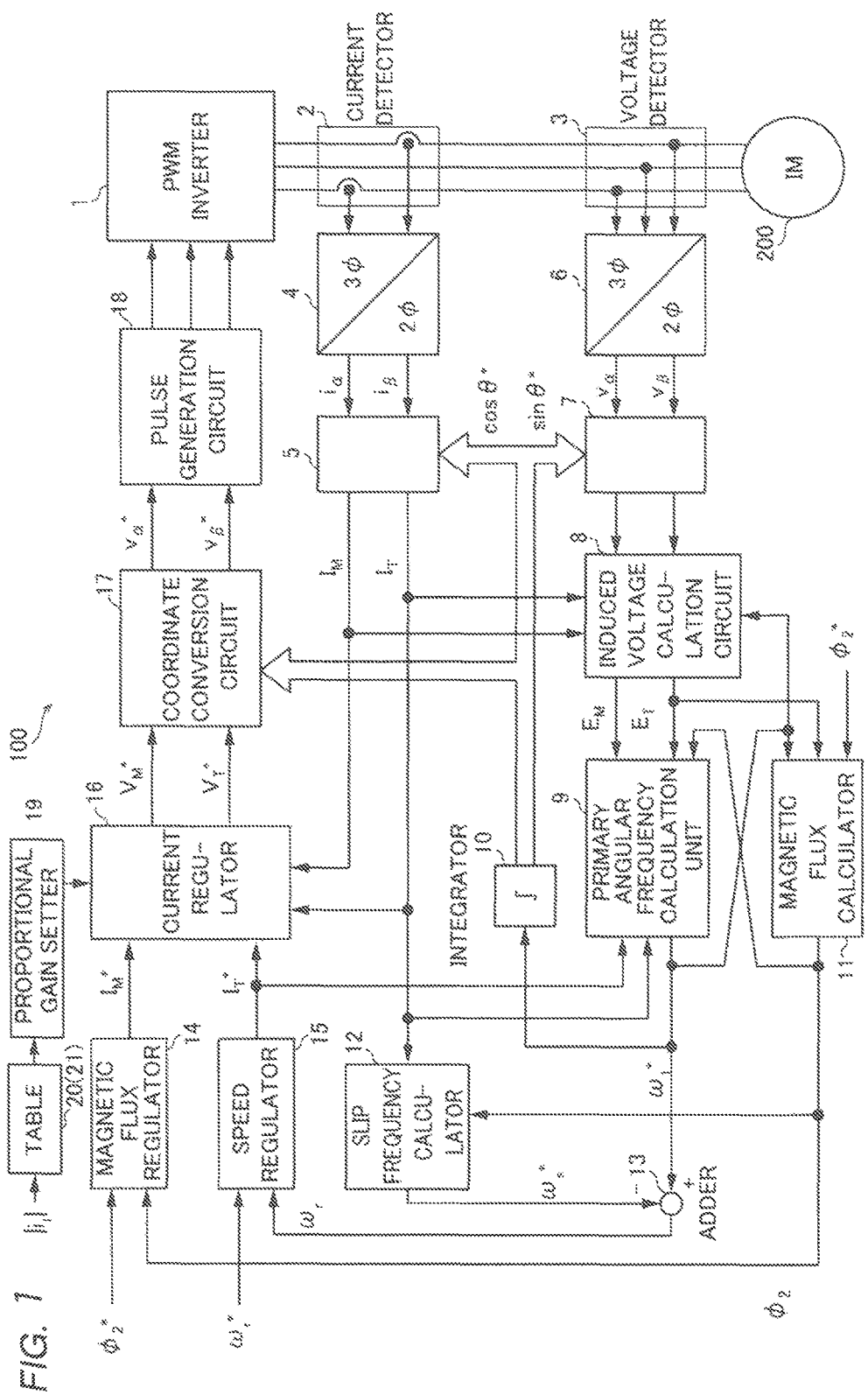
FIG. 1 is a block diagram showing the structure of a controller according to an embodiment.

As shown in FIG. 1, the controller 100 includes a PWM inverter 1 that converts a direct current into an alternating current by switching operation and supplies alternating-current power to the induction motor 200. Furthermore, a current detector 2 that detects the alternating current (primary current) output from the PWM inverter 1 and a voltage detector 3 that detects an alternating-current voltage output from the PWM inverter 1 are provided on the input side of the induction motor 200.

The controller 100 further includes a three-phase/two-phase converter 4. The three-phase/two-phase converter 4 converts the primary current detected by the current detector 2 into two-phase quantities ($i_\alpha$, $i_\beta$) of a stator coordinate system.

The controller 100 further includes a vector rotator 5. The vector rotator 5 converts the two-phase quantities $i_\alpha$ and $i_\beta$ of the stator coordinate system into a magnetization current actual value $I_M$ and a torque current actual value $I_T$, respectively. The magnetization current actual value $I_M$ and the torque current actual value $I_T$ are input into a current regulator 16 and an induced voltage calculation circuit 8 described later. The torque current actual value $I_T$ is further input into a slip frequency calculator 12 and a primary angular frequency calculation unit 9 described later.

The controller 100 further includes a three-phase/two-phase converter 6, a vector rotator 7, and the induced voltage calculation circuit 8. The voltage detector 3, the three-phase/two-phase converter 6, the vector rotator 7, and the induced voltage calculation circuit 8 detect the induced voltage vector E of the induction motor 200, and calculate $E_M$ and $E_T$, which are components of the induced voltage vector E.

The controller 100 further includes the primary angular frequency calculation unit 9. The primary angular frequency calculation unit 9 calculates a primary frequency command ω₁* based on the components $E_M$ and $E_T$ of the induced voltage vector E output from the induced voltage calculation circuit 8.

The controller 100 further includes an integrator 10. The integrator 10 converts the primary frequency command ω₁* input from the primary angular frequency calculation unit 9 into a phase angle command value θ*. The phase angle command value θ* is used for vector/current vector calculation in the vector rotator 5, the vector rotator 7, and a coordinate conversion circuit 17 described later.

The controller 100 further includes a magnetic flux calculator 11. The magnetic flux calculator 11 calculates a magnetic flux calculation value φ₂ from the primary frequency command ω₁*, the component $E_T$ (T-axis induced voltage) of the induced voltage vector E, and a magnetic flux command value φ₂*.

The controller 100 further includes the slip frequency calculator 12. The slip frequency calculator 12 outputs a slip frequency command value ω_s* based on the torque current actual value $I_T$ and the magnetic flux calculation value φ₂.

The controller 100 further includes an adder 13. The adder 13 subtracts the slip frequency command value ω_s* from the primary frequency command ω₁*, and outputs a speed estimated value ω_r.

The controller 100 further includes a magnetic flux regulator 14. The magnetic flux regulator 14 generates a magnetization current command value $I_M$* from a deviation between the magnetic flux command value φ₂* and the magnetic flux calculation value φ₂.

The controller 100 further includes a speed regulator 15. The speed regulator 15 generates a torque current command value $I_T$* from a deviation between the speed command value ω_r* and the speed estimated value ω_r.

The controller 100 further includes the current regulator 16. The magnetization current command value $I_M$* and the magnetization current actual value $I_M$, which are magnetic flux axial components of the primary current, and the torque current command value $I_T$* and the torque current actual value $I_T$, which are torque axial components perpendicular to the magnetic flux axial components, are input into the current regulator 16. The current regulator 16 generates and outputs a magnetization voltage command value $V_M$* based on the magnetization current command value $I_M$* and the magnetization current actual value $I_M$, and generates and outputs a torque voltage command value $V_T$* based on the torque current command value $I_T$* and the torque current actual value $I_T$. The current regulator 16 feeds back the magnetization current actual value $I_M$ to the magnetization current command value $I_M$* and feeds back the torque current actual value $I_T$ to the torque current command value $I_T$* to perform feedback control. The detailed structure of the current regulator 16 is described later. The current regulator 16 is an example of a "current regulator" in the claims.

The controller 100 further includes the coordinate conversion circuit 17. The coordinate conversion circuit 17 converts the magnetization voltage command value $V_M$* and the torque voltage command value $V_T$* of a primary voltage command value into two-phase quantities $v_\alpha$* and $v_\beta$* of the stator coordinate system.

The controller 100 further includes a pulse generation circuit 18. The pulse generation circuit 18 converts the two-phase quantities $v_\alpha$* and $v_\beta$* into drive pulses and outputs the drive pulses to the PWM inverter 1.

(Detailed Structure of Current Regulator)

Figure 2:
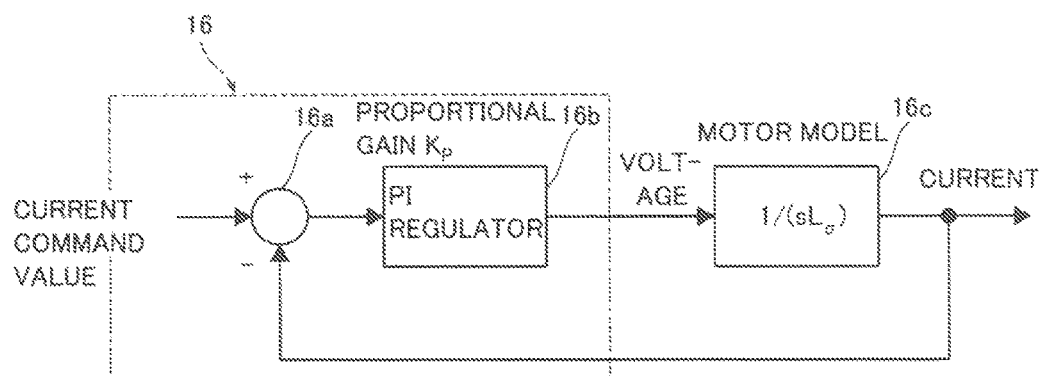
FIG. 2 is an equivalent block diagram of a current regulator of the controller according to the embodiment.

The detailed structure of the current regulator 16 is now described with reference to FIG. 2. FIG. 2 shows an equivalent block diagram of the current regulator 16.

The current command value (the magnetization current command value $I_M$* or the torque current command value $I_T$*) and the current actual value (the magnetization current actual value $I_M$ or the torque current actual value $I_T$) are input into the current regulator 16. A subtractor 16a subtracts the current actual value from the current command value. A value (deviation) obtained by subtracting the current actual value from the current command value is input into a PI regulator 16b. In the PI regulator 16b, the operation amount (voltage) is calculated from the input deviation using a proportional gain $K_p$. The proportional gain $K_p$ denotes the ratio (operation amount/deviation) of the operation amount to the deviation. A current (current actual value) is output from a motor model 16c based on the operation amount (voltage) calculated by the PI regulator 16b. The motor model 16c is obtained by expressing the pulse generation circuit 18, the PWM inverter 1, and the induction motor 200 in FIG. 1 as a transfer function, and converts a current that flows through the induction motor 200 into the magnetization current actual value $I_M$ or the torque current actual value $I_T$ obtained via the current detector 2, the three-phase/two-phase converter 4, and the vector rotator 5, and outputs the magnetization current actual value $I_M$ or the torque current actual value $I_T$. That is, the motor model 16c can approximate the relationship between the output voltage of the PWM inverter 1 based on the operation amount calculated by the PI regulator 16b and the current that flows through the induction motor 200. The transfer function of the motor model 16c is proportional (=1/(s$L_\sigma$)) to the reciprocal of the leakage inductance $L_\sigma$. It should be noted that "s" denotes a complex domain in Laplace transform. That is, in the current regulator 16, feedback control is performed based on the current command values and the current actual values.

The appropriate value of the proportional gain $K_p$ of the current regulator 16 is a value proportional to the leakage inductance $L_\sigma$, as shown in the following equation. This is because the motor model 16c is proportional (=1/(s$L_\sigma$)) to the reciprocal of the leakage inductance $L_\sigma$.

$$K_p = K \times L_\sigma$$

Here, K represents a proportional constant (constant value), which is a value determined by the delay time of a motor control system or the calculation cycle of digital control. When the delay time of the motor control system is large, for example, K becomes small. When the calculation cycle of digital control is short, K becomes large.

Figure 3:
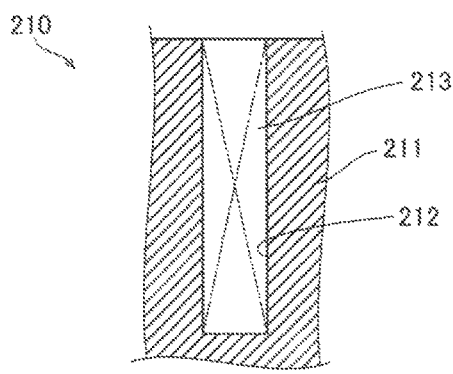
FIG. 3 is a diagram showing an induction motor in which a slot of a rotor is open.
Figure 4:
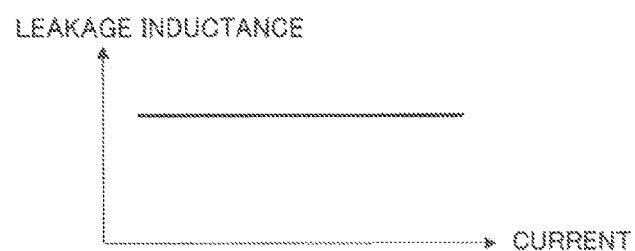
FIG. 4 is a diagram showing the relationship between a primary current and a leakage inductance of the induction motor in which the slot of the rotor is open.

As shown in FIG. 3, in an induction motor 210, when a slot 212 of a rotor 211 is open (in the case of the slot 212, the stator side of which is open), the rotor 211 (magnetic body) does not close a secondary conductor 213, and hence there is no magnetic saturation. Therefore, as shown in FIG. 4, a change of the leakage inductance $L_\sigma$ in response to the primary current is small.

Figure 5:
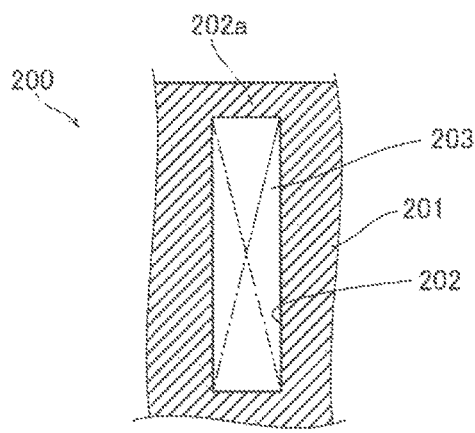
FIG. 5 is a diagram showing an induction motor in which a slot of a rotor is closed.
Figure 6:
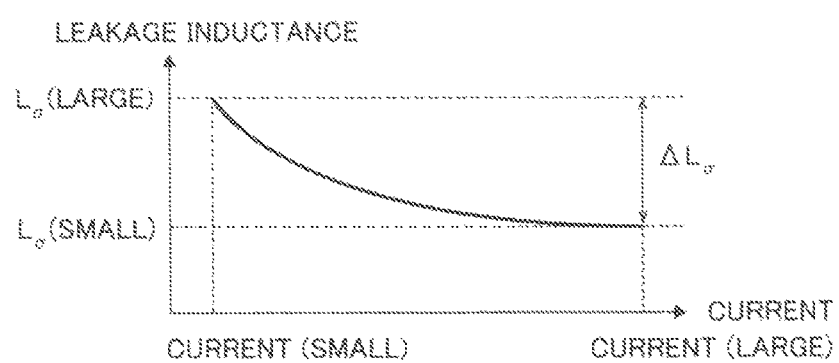
FIG. 6 is a diagram showing the relationship between a primary current and a leakage inductance of the induction motor in which the slot of the rotor is closed.

On the other hand, as shown in FIG. 5, when a slot 202 of a rotor 201 of the induction motor 200 is closed (in the case of the slot 202, the stator side of which is not open), a portion 202a of the rotor 201 that closes the slot 202 (the portion 202a of the rotor 201 corresponding to the stator side of a secondary conductor 203 disposed in the slot 202) is thin, and hence a magnetic flux that flows through a magnetic body (rotor 201) is easily saturated. Thus, as shown in FIG. 6, the magnitude of the leakage inductance $L_\sigma$ (an inductance corresponding to a magnetic flux, which does not intersect with the secondary conductor 203 on the rotor 201 side, of magnetic fluxes produced by a current that flows on the stator side) changes in response to the primary current. Specifically, the larger the primary current is, the smaller the leakage inductance $L_\sigma$ becomes.

When the proportional gain $K_p$ is too large with respect to the leakage inductance $L_\sigma$ the primary current oscillates. For example, as shown in FIG. 6, in the induction motor 200 in which a difference (amount of change $\Delta L_\sigma$) between a leakage inductance $L_\sigma$ (large) in the case of a small primary current and a leakage inductance $L_\sigma$ (small) in the case of a large primary current is relatively large, the proportional gain $K_p(=K \times L_\sigma(\text{large}))$ is set based on the above equation using the leakage inductance $L_\sigma$ (large) in the case of a small primary current. In this case, at a point where the primary current is large, the actual leakage inductance $L_\sigma$ is $L_\sigma$ (small), and hence the proportional gain $K_p$ becomes excessively large. Thus, oscillation of the primary current, for example, occurs.

When the proportional gain $K_p$ is too small with respect to the leakage inductance $L_\sigma$ the response becomes slow. The fact that the proportional gain $K_p$ is small means that the operation amount is small with respect to the deviation, and hence the response becomes slow.

Therefore, according to the present embodiment, as shown in FIG. 1, the controller 100 includes a proportional gain setter 19 that sets the magnitude of the proportional gain $K_p$ of the feedback control of the current regulator 16. The proportional gain setter 19 sets the magnitude of the proportional gain $K_p$ based on the leakage inductance $L_\sigma$ in response to the primary current. Specifically, the proportional gain setter 19 reduces the proportional gain $K_p$ when the amount of change $\Delta L_\sigma$ in the leakage inductance $L_\sigma$ in response to the primary current is large, and increases the proportional gain $K_p$ when the amount of change $\Delta L_\sigma$ in the leakage inductance $L_\sigma$ in response to the primary current is small.

That is, as shown in FIG. 6, when the difference (amount of change $\Delta L_\sigma$) between the leakage inductance $L_\sigma$ (large) in the case of a small primary current and the leakage inductance $L_\sigma$ (small) in the case of a large primary current is large, the proportional gain $K_p$ is set using the leakage inductance $L_\sigma$ (small) in the case of a large primary current ($K_p=K \times L_\sigma(\text{small})$). Thus, oscillation of the primary current is significantly reduced or prevented even when the primary current is large.

Figure 7:
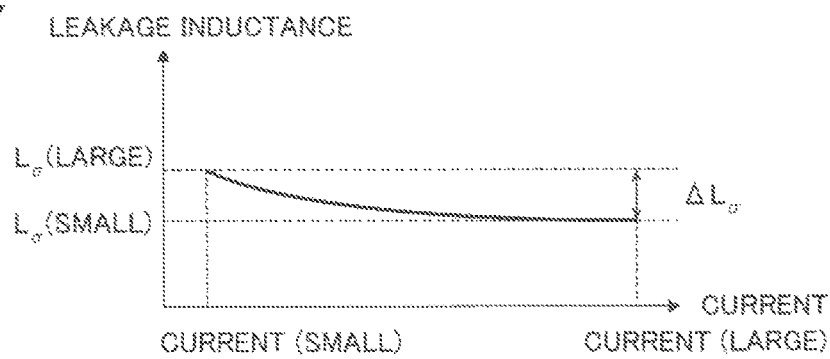
FIG. 7 is another diagram showing the relationship between the primary current and the leakage inductance of the induction motor in which the slot of the rotor is closed.

As shown in FIG. 7, when the amount of change $\Delta L_\sigma$ between the leakage inductance $L_\sigma$ (large) in the case of a small primary current and the leakage inductance $L_\sigma$ (small) in the case of a large primary current is small, the proportional gain $K_p$ is set using the leakage inductance $L_\sigma$ (large) in the case of a small primary current ($K_p=K \times L_\sigma(\text{large})$). That is, when the amount of change $\Delta L_\sigma$ is small, even if the proportional gain $K_p$ is increased using $L\sigma$ (large), the primary current does not conceivably oscillate even in the case where the primary current is large, and hence the proportional gain $K_p$ is set using $L_\sigma$ (large). Thus, the response becomes fast (the responsiveness becomes high).

According to the present embodiment, the proportional gain setter 19 reduces the proportional gain $K_p$ when the amount of change $\Delta L_\sigma$ in the leakage inductance $L_\sigma$ in response to the primary current is equal to or more than a predetermined value, and increases the proportional gain $K_p$ when the amount of change $\Delta L_\sigma$ in the leakage inductance $L_\sigma$ in response to the primary current is less than the predetermined value. For example, the predetermined value is a value of 10% of $L_\sigma$ (small).

According to the present embodiment, the proportional gain setter 19 reduces the proportional gain $K_p$ based on a leakage inductance $L_\sigma$ (small) in the case of a rated load when the amount of change $\Delta L_\sigma$ in the leakage inductance $L_\sigma$ in response to the primary current is equal to or more than the predetermined value. When the induction motor 200 is driven at the rated load, a relatively large primary current flows therethrough, and hence the leakage inductance $L_\sigma$ becomes small. The proportional gain setter 19 sets a relatively small proportional gain $K_p$ using this leakage inductance $L_\sigma$ (small). When the amount of change $\Delta L_\sigma$ in the leakage inductance $L_\sigma$ in response to the primary current is less than the predetermined value, the proportional gain $K_p$ is increased based on a leakage inductance $L_\sigma$ in the case of no load. When the induction motor 200 is driven at no load, a relatively small primary current flows therethrough, and hence the leakage inductance $L_\sigma$ becomes large. The proportional gain setter 19 sets a relatively large proportional gain $K_p$ using this leakage inductance $L_\sigma$ (large).

Figures 8, 9:
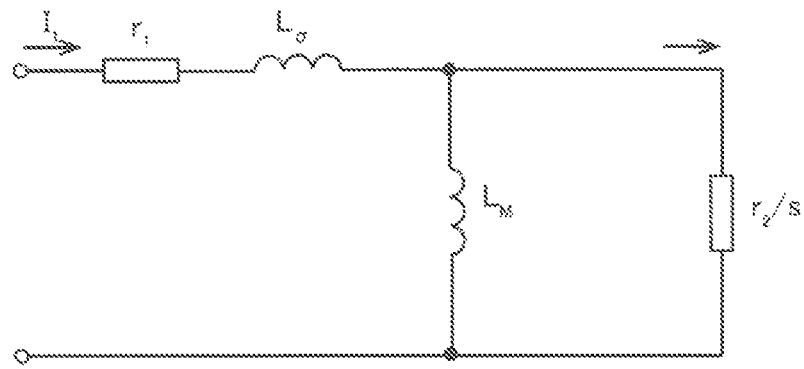
FIG. 8 is a diagram showing a table in which the primary current and the leakage inductance are associated with each other.
FIG. 9 is an equivalent circuit diagram of the induction motor.

According to the present embodiment, as shown in FIG. 1, the controller 100 includes a storage 21 that stores a table 20 in which the primary current and the leakage inductance $L_\sigma$ are associated with each other. Specifically, as shown in FIG. 8, the storage 21 stores the table 20 in which the primary current (large, small) and the leakage inductance $L_\sigma$ ($L_\sigma$ (small), $L_\sigma$ (large)) are associated with each other. The proportional gain setter 19 sets the magnitude of the proportional gain $K_p$ based on the table 20 stored in the storage 21.

More specifically, in the controller 100, a function (mode) of measuring the motor constant (a primary resistance $r_1$, a secondary resistance $r_2$, the leakage inductance $L_\sigma$, etc. shown in FIG. 9, for example) of the induction motor 200 is provided in advance. In FIG. 9, $L_M$ represents an excitation inductance, and s represents a slip (a shift between an actual rotational speed and a synchronous speed when a load is applied). When the induction motor 200 is first connected to the controller 100, the leakage inductance $L_\sigma$ of the induction motor 200 is measured by this function (mode) of measuring the motor constant. At this time, the magnitude $|i_1|$ of the primary current is changed from a small value to a large value. Thus, the leakage inductance $L_\sigma$ at each current value is measured. This measured result is stored in the storage 21 as the table 20 in which the primary current and the leakage inductance $L_\sigma$ are associated with each other. For example, as shown in FIG. 8, the primary current and the leakage inductance $L_\sigma$ (large) at no load, and the primary current and the leakage inductance $L_\sigma$ (small) at the rated load are stored. The function of measuring the motor constant of the induction motor 200 is provided in advance in the controller 100, and hence the magnitude of the proportional gain $K_p$ can be set without separately providing a function of measuring the leakage inductance $L_\sigma$.

When control of the induction motor 200 is actually started by the controller 100, the proportional gain setter 19 refers to the table 20 stored in the storage 21 and sets the proportional gain $K_p$ to a large value ($=K \times L_\sigma$ (large)) or a small value ($=K \times L_\sigma$ (small)) based on the difference (amount of change $\Delta L_\sigma$) between the leakage inductance $L_\sigma$ (large) and the leakage inductance $L_\sigma$ (small). That is, the magnitude of the proportional gain $K_p$ does not change while the controller 100 is actually controlling the induction motor 200. Thus, the induction motor 200 can be easily controlled as compared with the case where the magnitude of the proportional gain $K_p$ changes during the control of the induction motor 200.

(Effects of Present Embodiment)

According to the present embodiment, the following effects can be obtained.

According to the present embodiment, as described above, the controller 100 for the induction motor 200 includes the proportional gain setter 19 that sets the magnitude of the proportional gain $K_p$ based on the leakage inductance $L_\sigma$ in response to the primary current. Thus, the magnitude of the proportional gain $K_p$ is set by the proportional gain setter 19 based on the leakage inductance $L_\sigma$ in response to the primary current, and hence it is possible to significantly reduce or prevent an excessive increase or an excessive reduction in the proportional gain $K_p$ of the feedback control with respect to the leakage inductance $L_\sigma$. Consequently, even when the leakage inductance $L_\sigma$ changes with a change in primary current, the induction motor 200 can be appropriately controlled.

According to the present embodiment, as described above, the proportional gain setter 19 reduces the proportional gain $K_p$ when the amount of change $\Delta L_\sigma$ in the leakage inductance $L_\sigma$ in response to the primary current is large, and increases the proportional gain $K_p$ when the amount of change $\Delta L_\sigma$ in the leakage inductance $L_\sigma$ in response to the primary current is small. Thus, it is possible to appropriately significantly reduce or prevent an excessive increase or an excessive reduction in the proportional gain $K_p$ of the feedback control with respect to the leakage inductance $L_\sigma$ both when the amount of change $\Delta L_\sigma$ in the leakage inductance $L_\sigma$ is large and when the amount of change $\Delta L_\sigma$ in the leakage inductance $L_\sigma$ is small.

According to the present embodiment, as described above, the proportional gain setter 19 reduces the proportional gain $K_p$ when the amount of change $\Delta L_\sigma$ in the leakage inductance $L_\sigma$ in response to the primary current is equal to or more than the predetermined value, and increases the proportional gain $K_p$ when the amount of change $\Delta L_\sigma$ in the leakage inductance $L_\sigma$ in response to the primary current is less than the predetermined value. Thus, it is possible to easily determine, based on the predetermined value, whether the amount of change $\Delta L_\sigma$ in the leakage inductance $L_\sigma$ is large or small.

According to the present embodiment, as described above, the proportional gain setter 19 reduces the proportional gain $K_p$ based on the leakage inductance $L_\sigma$ in the case of the rated load when the amount of change $\Delta L_\sigma$ in the leakage inductance $L_\sigma$ in response to the primary current is equal to or more than the predetermined value, and increases the proportional gain $K_p$ based on the leakage inductance $L_\sigma$ in the case of no load when the amount of change $\Delta L_\sigma$ in the leakage inductance $L_\sigma$ in response to the primary current is less than the predetermined value. Thus, the magnitude of the proportional gain $K_p$ is set using two values of the leakage inductance $L_\sigma$ in the case of the rated load and the leakage inductance $L_\sigma$ in the case of no load, and hence it is possible to significantly reduce or prevent an increase in load on the controller 100 as compared with the case where the number of values used is relatively large. Furthermore, the magnitude of the leakage inductance $L_\sigma$ in the case of the rated load is relatively small, and hence the set proportional gain $K_p$ can be easily reduced. The magnitude of the leakage inductance $L_\sigma$ in the case of no load is relatively large, and hence the set proportional gain $K_p$ can be easily increased.

According to the present embodiment, as described above, the controller 100 for the induction motor 200 further includes the storage 21 that stores the table 20 in which the primary current and the leakage inductance $L_\sigma$ are associated with each other, and the proportional gain setter 19 sets the magnitude of the proportional gain $K_p$ based on the table 20 stored in the storage 21. Thus, it is possible to easily set the magnitude of the proportional gain $K_p$ based on the table 20 stored in the storage 21 without remeasuring the association between the primary current and the leakage inductance $L_\sigma$.

Modified Examples

The embodiment disclosed this time must be considered as illustrative in all points and not restrictive. The range of the present invention is not shown by the above description of the embodiment but by the scope of claims for patent, and all modifications (modified examples) within the meaning and range equivalent to the scope of claims for patent are further included.

For example, while the proportional gain $K_p$ is reduced based on the leakage inductance $L_\sigma$ in the case of the rated load when the amount of change $\Delta L_\sigma$ in the leakage inductance $L_\sigma$ in response to the primary current is equal to or more than the predetermined value in the aforementioned embodiment, the present invention is not restricted to this. For example, the proportional gain $K_p$ may alternatively be reduced based on a leakage inductance $L_\sigma$ in the case of a load other than the rated load when the amount of change $\Delta L_\sigma$ in the leakage inductance $L_\sigma$ in response to the primary current is equal to or more than the predetermined value.

While the proportional gain $K_p$ is increased based on the leakage inductance $L_\sigma$ in the case of no load when the amount of change $\Delta L_\sigma$ in the leakage inductance $L_\sigma$ in response to the primary current is less than the predetermined value in the aforementioned embodiment, the present invention is not restricted to this. For example, the proportional gain $K_p$ may alternatively be increased based on the leakage inductance $L_\sigma$ in the case of a load other than no load when the amount of change $\Delta L_\sigma$ in the leakage inductance $L_\sigma$ in response to the primary current is less than the predetermined value.

While the proportional gain $K_p$ is reduced or increased (is set to one of the two values) according to the amount of change $\Delta L_\sigma$ in the leakage inductance $L_\sigma$ in the aforementioned embodiment, the present invention is not restricted to this. For example, the proportional gain $K_p$ may alternatively be set to one of three or more values according to the amount of change $\Delta L_\sigma$ in the leakage inductance $L_\sigma$.

While the magnitude of the proportional gain $K_p$ is set based on the primary current and the leakage inductance $L_\sigma$ measured in the function (mode) of measuring the motor constant of the induction motor 200 in the aforementioned embodiment, the present invention is not restricted to this. For example, the magnitude of the proportional gain $K_p$ may alternatively be set based on the primary current and the leakage inductance $L_\sigma$ measured by a method other than the function (mode) of measuring the motor constant of the induction motor 200.

While the magnitude of the proportional gain $K_p$ does not change during control of the induction motor 200 by the controller 100 in the aforementioned embodiment, the present invention is not restricted to this. For example, the magnitude of the proportional gain $K_p$ may alternatively be changed during control of the induction motor 200 by the controller 100.

What is claimed is:

1. A controller for an induction motor that controls the induction motor in which a leakage inductance changes with a change in primary current, comprising:

a current regulator into which a magnetization current command value and a magnetization current actual value, which are magnetic flux axial components of the primary current, and a torque current command value and a torque current actual value, which are torque axial components perpendicular to the magnetic flux axial components, are input, and which generates a magnetization voltage command value based on the magnetization current command value and the magnetization current actual value and generates a torque voltage command value based on the torque current command value and the torque current actual value; and a proportional gain setter that sets a magnitude of a proportional gain of the current regulator, wherein the proportional gain setter sets the magnitude of the proportional gain based on the leakage inductance in response to the primary current.

2. The controller for the induction motor according to claim 1, wherein the proportional gain setter reduces the proportional gain when an amount of change in the leakage inductance in response to the primary current is large, and increases the proportional gain when the amount of change in the leakage inductance in response to the primary current is small.

3. The controller for the induction motor according to claim 2, wherein the proportional gain setter reduces the proportional gain when the amount of change in the leakage inductance in response to the primary current is equal to or more than a predetermined value, and increases the proportional gain when the amount of change in the leakage inductance in response to the primary current is less than the predetermined value.

4. The controller for the induction motor according to claim 3, wherein the proportional gain setter reduces the proportional gain based on the leakage inductance in a case of a rated load when the amount of change in the leakage inductance in response to the primary current is equal to or more than the predetermined value, and increases the proportional gain based on the leakage inductance in a case of no load when the amount of change in the leakage inductance in response to the primary current is less than the predetermined value.

5. The controller for the induction motor according to claim 1, further comprising a storage that stores a table in which the primary current and the leakage inductance are associated with each other, wherein the proportional gain setter sets the magnitude of the proportional gain based on the table stored in the storage.

* * * * *